United States Patent
Huang et al.

(10) Patent No.: US 8,198,848 B2
(45) Date of Patent: Jun. 12, 2012

(54) SYSTEM AND METHOD FOR COMPENSATING CHARACTERISTICS OF A FAN

(75) Inventors: Pai-Ching Huang, Taipei (TW); Jiang-Wen Huang, Taipei (TW)

(73) Assignee: Asustek Computer Inc., Taipei (TW)

( * ) Notice: Subject to any disclaimer, the term of this patent is extended or adjusted under 35 U.S.C. 154(b) by 498 days.

(21) Appl. No.: 12/414,100

(22) Filed: Mar. 30, 2009

(65) Prior Publication Data

US 2009/0289590 A1    Nov. 26, 2009

(30) Foreign Application Priority Data

May 23, 2008 (TW) ................................ 97119227 A

(51) Int. Cl.
*H02P 6/08* (2006.01)

(52) U.S. Cl. ........ 318/471; 318/445; 318/811; 318/810; 318/807; 318/767

(58) Field of Classification Search .................. 318/471, 318/445, 811, 810, 807, 767, 727
See application file for complete search history.

(56) References Cited

U.S. PATENT DOCUMENTS

| 6,037,732 | A * | 3/2000 | Alfano et al. ................. 318/471 |
| 6,188,189 | B1 * | 2/2001 | Blake ............................ 318/471 |
| 6,933,697 | B2 * | 8/2005 | Marando et al. .............. 318/599 |
| 7,064,511 | B2 * | 6/2006 | Marando et al. ......... 318/400.08 |
| 7,305,316 | B2 * | 12/2007 | Frankel et al. ................. 702/99 |

* cited by examiner

*Primary Examiner* — Walter Benson
*Assistant Examiner* — David Luo
(74) *Attorney, Agent, or Firm* — Birch, Stewart, Kolasch & Birch, LLP

(57) ABSTRACT

A system for compensating the characteristics of a fan, applied to a heat-dissipating fan of an electronic device. This system comprises of an analyzing module for analyzing the relation between the duty ratio of pulse width modulation (PWM) and the rotational speed of the fan to generate analyzing data, and a compensating module for generating compensating data basing on the analyzing data and a specific proportion relation between the temperature and the duty ratio of PWM.

15 Claims, 3 Drawing Sheets

SYSTEM AND METHOD FOR COMPENSATING CHARACTERISTICS OF A FAN

FIELD OF THE INVENTION

The present invention relates to a system and a method for compensating characteristics of a fan, and more particularly to a compensating system and a compensating method, which are applied to a heat-dissipating fan of an electronic device, for performing compensation process according to actual relation between the temperature and the rotational speed of the fan.

BACKGROUND OF THE INVENTION

With the continuing development and progress of electronic technology, the current commercial electronic products are always designed to be light, thin, short and small with multiple functions and rapid processing speed while taking the convenience and practicability into consideration to comply with the life demand of the modern society. In addition, with the maturity of IC design and manufacture technique, the electronic products in the new generation not only have slim and tiny shape but also have processing performance which is several times better than the conventional products. Therefore, all kinds of digital data such as sound effects, images, and patterns can be processed easily by means of their great computing and calculating ability.

It is worthy to note that the design of the electronic products must take the heat dissipation problem in the operation process into consideration due to their much more complicated operation performance. The commonly seen solution is to provide them with better heat dissipation performance by improving their materials and mechanisms. If needed, a heat-dissipating fan is mounted in the electronic product to prevent the electronic products from excessive operation temperature.

In order to promote the performance of the heat-dissipating fan, the rotational speed of the conventional fan designed by the manufacturers is always thus increased when the temperature of the electronic product is raised so as to accelerate heat dissipation. The typical method is performed by detecting the temperature of the electronic device, and then controlling the rotational speed of the fan depending on the detected temperature via a fan controller. Generally speaking, the rotational speed of the fan can be controlled by using the voltage output or the duty ratio of pulse width modulation (PWM).

Besides, some manufacturers also provide the fans with several fixed fan-temperature curves such that the user is allowed to select one of them. As a result, according to the operating requirement, the user is allowed to select one kind of fixed fan-temperature curve so as to control the rotational speed of the fan to comply with the change of temperature.

However, there are still many problems in the existing control design of the fan. First, as described above, some manufacturers provide several fixed fan-temperature curves to allow the user to make selection. However, these predetermined fixed curves can not actually or completely reflect the actual operating environment where the user operates the electronic device. In other words, for the users distributed over the world, they can only select the existing predetermined fixed curves and can not adjust the fan to the most appropriate rotational speed to comply with the different environments where they live.

Moreover, the slight variation in machine constitution or slight inaccuracy in the manufacture process causes even the same lot of electronic products have different characteristics from one another, resulting in that the control process of the rotational speed during the practical rotation becomes non-linear. Therefore, it is impossible to adjust the rotational speed basing on the predetermined fan-controlling model.

Furthermore, the user is incapable of monitoring or determining whether the fan-controlling performance is identical to the setting of production. Therefore, the user is unable to know that the related control device needs to be replace or repaired even when the related device is damaged or deviated.

SUMMARY OF THE INVENTION

In view of this, the primary object of the invention is to provide a system for compensating characteristics of a fan, wherein this system is applied to a heat-dissipating fan of an electronic device and it comprises an analyzing module and a compensating module. The analyzing module is utilized for analyzing a relation between a duty ratio of pulse width modulation (PWM) and a rotational speed of the fan to generate an analyzing result. The compensating module is utilized for generating a compensating result basing on the analyzing result and a specific proportion relation between the duty ratio of PWM and the temperature.

In addition, the present invention also discloses a method for compensating characteristics of a fan, wherein this system is applied to a heat-dissipating fan of an electronic device. The method mainly comprises the following steps. First, a relation between a duty ratio of pulse width modulation (PWM) and a rotational speed of the fan is analyzed to generate an analyzing result. Then, a compensating result is generated basing on the analyzing result and a specific proportion relation between a temperature and the duty ratio of PWM. Thereafter, an operation temperature of the electronic device is detected to generate a specific duty ratio of PWM basing on the operation temperature and the compensating result for adjusting the rotational speed of the fan.

DESCRIPTION OF THE PREFERRED EMBODIMENT

Figure 1:
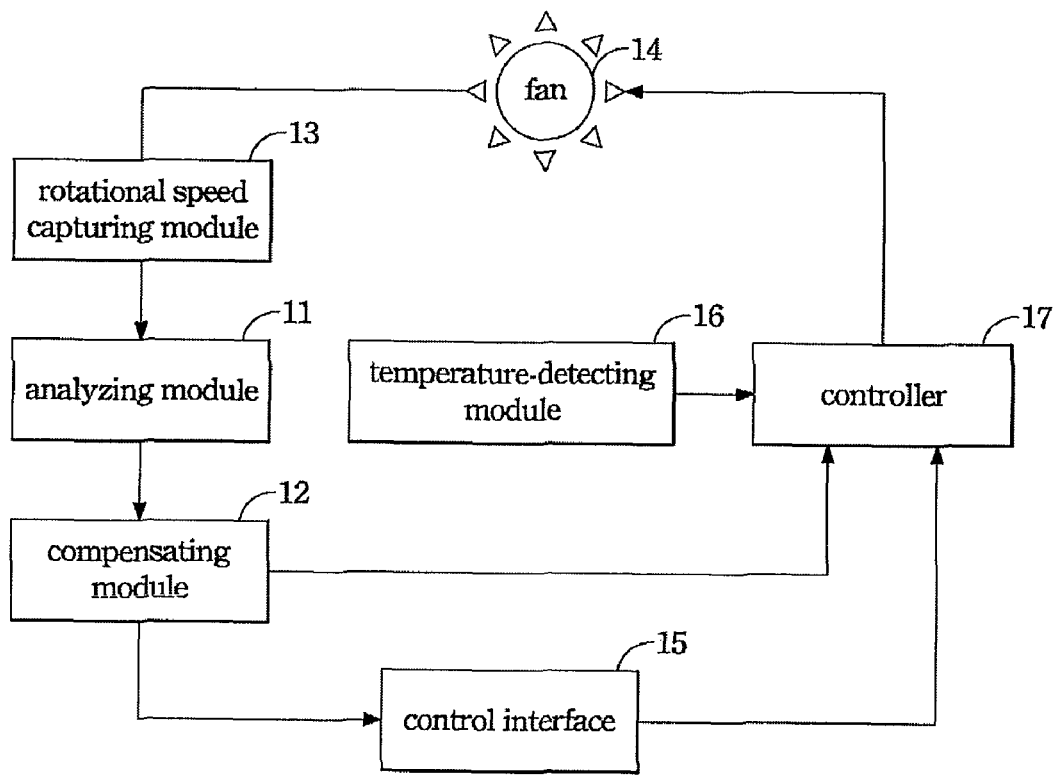
FIG. 1 is a functional block diagram showing a system for compensating characteristics of a fan of the present invention.

Referring to FIG. 1, which shows a system 1 for compensating characteristics of a fan according to the present invention. The system 1 for compensating characteristics of the fan can be applied to an electronic device for analyzing and compensating the characteristics of a heat-dissipating fan of the electronic device. In one preferred embodiment, the above-described system 1 mainly comprises an analyzing module 11 and a compensating module 12, wherein the analyzing module 11 is designed to analyze a relation between a duty ratio of pulse width modulation (PWM) and a rotational speed of the fan so as to generate an analyzing result. The compensating module 12 is designed for generating a compensating result basing on the analyzing result generated by the analyzing module 11 and a specific proportion relation between the duty ratio of PWM and temperature.

For the purpose of providing the analyzing module 11 with required data, the system 1 is also equipped with a rotational speed capturing module 13. This rotational speed capturing module 13 is respectively connected to a fan 14 of an electronic device and the analyzing module 11 so as to capture various rotational speeds of the fan 14 in various conditions and to transmit the captured data of the rotational speeds to the analyzing module 11. For instance, with the increase of the duty ratio of PWM applied to the fan 14, the rotational speed capturing module 13 captures the actual data of the rotational speeds of the fan in the condition of different duty ratios of PWM and then transmits these data of rotational speeds to the analyzing module 11.

Once the analyzing module 11 generates the analyzing result basing on the relation between the rotational speed of the fan and the duty ratio of PWM, the compensating module 12 is then provided with this analyzing result. Thereafter, the compensating module 12 determines the manner to adjust the duty ratio of PWM which is should be outputted within various temperature ranges basing on the analyzing result so as to generate the compensating result.

In order to enable the user to further adjust the rotational speed of the fan 14, the system 1 for compensating the characteristics of the fan of the preset invention further comprises a control interface 15 so as to enable the user to further adjust the compensating result generated by the compensating module 12. In one preferred embodiment, this control interface 15 is a graphical user interface (GUI) so as to provide the user with a more intuitive and friendly operation method. This control interface 15 mainly enables the user to set the specific proportion relation between the temperature and the duty ratio of PWM for different temperature ranges.

Figure 2:
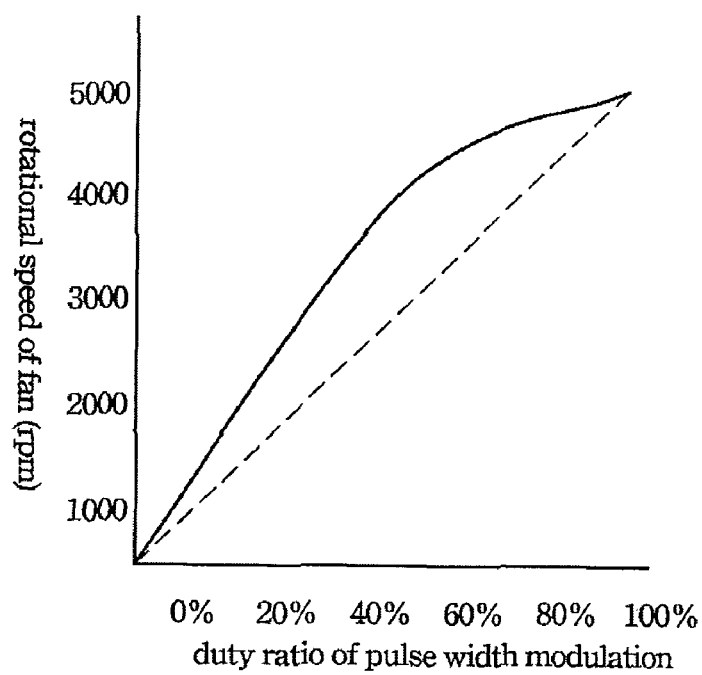
FIG. 2 is a diagram showing the characteristics curve of the fan displayed on a graphical user interface of the present invention.

Referring to FIG. 2, which shows the analyzing result generated by the analyzing module 11 by using the control interface 15. As described before, the analyzing module 11 performs the analysis step basing on the relation between the duty ratio of PWM and the rotational speed of the fan. Therefore, the analyzing result displayed on the control interface 15 is a line distributed in a rectangular coordinate system, wherein a transverse coordinate is the duty ratio of PWM and a longitudinal coordinate is the rotational speed of the fan.

After analyzing the relation between the duty ratios of PWM and rotational speeds of most fans, these fans 14 often have non-linear curves, such as the curve shown in FIG. 2, according to the analyzing result obtained by the present inventor. In addition, with the sustained increase in the duty ratio of PWM, the actual rotational speed does not increase linearly. The increase of actual rotational speed is slow after the actual rotational speed is increased to a certain value. For example, as shown in FIG. 2, after the rotational speed of the fan is raised to 4,500 rpm, the rotational speed is increased slowly.

Figure 3:
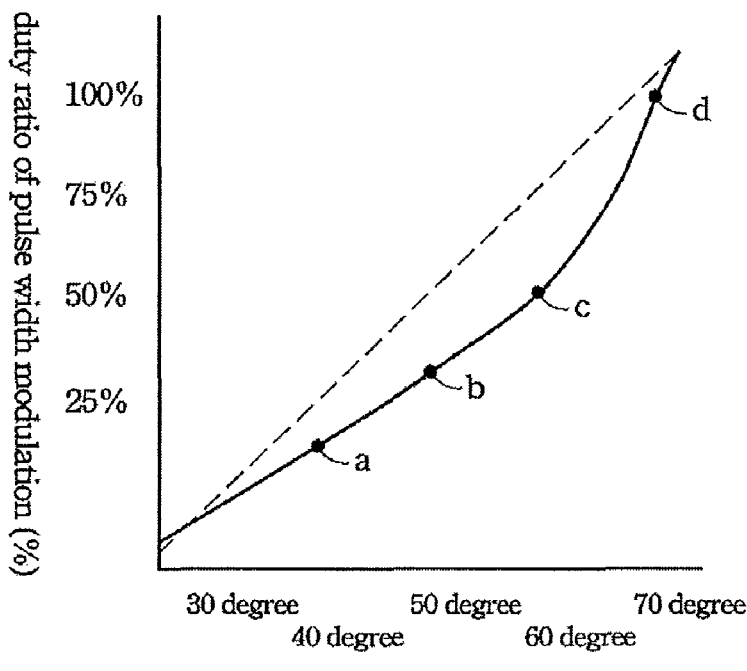
FIG. 3 is a diagram showing a compensating curve displayed on the graphical user interface of the present invention.

After the compensating module 12 receives the analyzing result transmitted from the analyzing module 11, it generates a corresponding compensating result basing on characteristics of the fan revealed by the analyzing result. Referring to FIG. 3, the compensating result displayed on the control interface 15 can be a line distributed in the rectangular coordinate system, wherein the transverse coordinate is the temperature and the longitudinal coordinate is the duty ratio of PWM.

Generally speaking, it is not easy to predict and control the non-linear system. There, there is a tendency to design the electronic device to allow the related components of the electronic device to be operated in linear condition. The dotted line shown in FIG. 2 shows an expected linear condition to operate the fan 14. In order to achieve this purpose, the compensating module 12 creates a corresponding compensating curve shown in FIG. 3 to serve as a compensating result of the fan 14 basing on the characteristics curve of fan 14 in FIG. 2.

As the condition shown in FIG. 2, the compensating curve shown in FIG. 3 provides the duty ratio of PWM with a higher grade at high temperature since the increase of the rotational speed of the fan is slow when the duty ratio of PWM is increasing continuously. For example, the duty ratio of PWM is increased from 30% to 50% when the temperature is in the range between 50 and 60 degrees centigrade. However, the duty ratio of PWM is increased from 50% to 100% when the temperature is in the range between 60 and 70 degrees centigrade.

In other words, the compensating module 12 decides a specific proportion relation between the temperature and the duty ratio of PWM basing on the analyzing result generated by the analyzing module 11 so as to generate a compensating result. As shown in FIG. 3, the compensating result is displayed by a compensating curve that is complementary to the analyzing result. Once the compensating module 12 depicts the compensating curve, it also decides the specific proportion relation between the temperature and the duty ratio of PWM subsequently basing on different temperature ranges. Namely, the compensating module 12 decides the slope relation between the temperature and the duty ratio of PWM of different temperature ranges.

As shown in FIG. 3, the compensating module 12 defines the range interval of temperature as 10 degrees centigrade so as to divide the compensating curve into four ranges including 30-40 degrees centigrade, 40-50 degrees centigrade, 50-60 degrees centigrade, and 60-70 degrees centigrade. Thereafter, the respective slope of the compensating curve which is similar to a straight line within different temperature ranges can be obtained. Referring to FIG. 3, the positions corresponding to 40 degrees centigrade, 50 degrees centigrade, 60 degrees centigrade, and 70 degrees centigrade, i.e., the points a, b, c, and d on the figure, are marked on the compensating curve. Thereafter, for the temperature range between 60 degrees centigrade and 70 degrees centigrade, the slope of the compensating curve, which is similar to the straight line, between point c and point d can be obtained. In other words, after deciding the range interval of the temperature and marking the respective points on the compensating curve for distinguishing the temperature ranges. The slope between the temperature and the duty ratio of PWM can be obtained by acquiring the slope of the straight line between two points such that the compensating result of the fan 14 can be thus generated. Of course, the range interval of the temperature may be defined to be smaller to comply with the design requirement of the fan. For example, the range interval of the temperature can be such as 5 degrees centigrade so as to divide the entire compensating curve into much more ranges. Thereafter, the respective slope of the compensating curve which is similar to a straight line within different temperature ranges is acquired.

Figure 4:
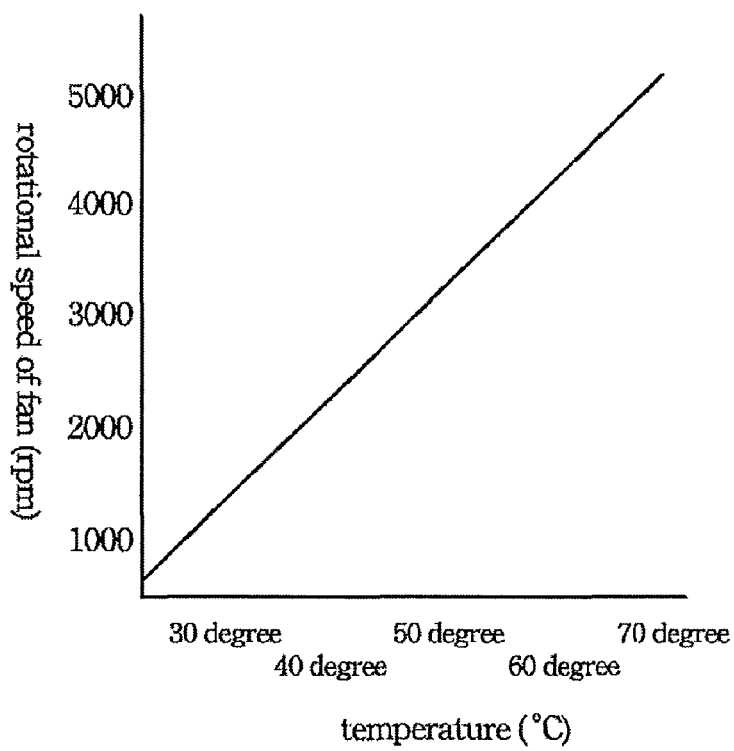
FIG. 4 is a diagram showing the compensated characteristics of the fan displayed on the graphical user interface of the present invention.
Figure 5:
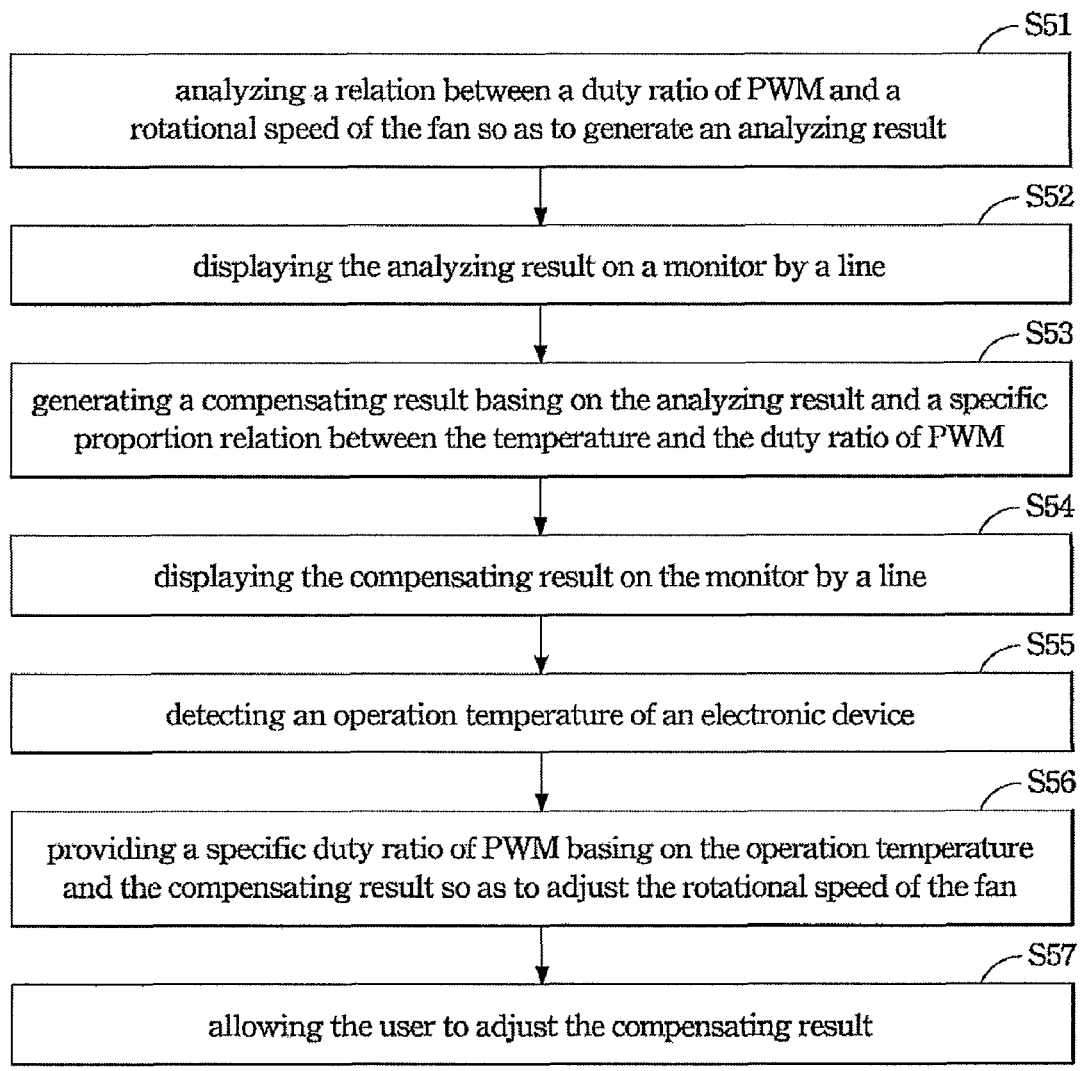
FIG. 5 is a process diagram showing the method for compensating characteristics of the fan of the present invention.

By using the compensating result generated by the compensating module 12, the analyzing result of the characteristics of the fan generated by the analyzing module 11 can be compensated such that the rotational speed of the fan 14 has the linear relation with the temperature as shown in FIG. 4.

In addition, as described before, in order to provide the user with more convenience, a control interface 15 of the present invention also allows the user to adjust the compensating result generated by the compensating module 12. As shown in FIG. 3, the user not only can decide the range of temperature but also can decide the slop relation between the temperature and the duty ratio of PWM of different temperature ranges so as to adjust the compensating result.

In one preferred embodiment, the system 1 for compensating the characteristics of the fan of the present invention further comprises a temperature-detecting module 16 and a controller 17, wherein the temperature-detecting module 16 is designed for detecting the temperature of the electronic device and for outputting a detected temperature. The controller 17 is respectively connected to the compensating module 12 and the temperature-detecting module 16 such that a specific duty ratio of PWM is outputted according to the compensating result and the detected temperature for thereby controlling the rotational speed of the fan. In other words, the outputted duty ratio of PWM can be adjusted by the controller 17 by using the specific proportion relation of each temperature range of the compensating result and the detected temperature for thereby achieving the purpose of adjusting the rotational speed of the fan.

In other words, if the system 1 for compensating the characteristics of the fan is originally not designed for the purpose of allowing the user to adjust the compensating result, the compensating result generated by the compensating module 12 will be outputted directly to the controller 17 for then adjusting and controlling the fan 14 by using the controller 17. On the contrary, if the system 1 for compensating the characteristics of the fan is originally designed for the purpose of allowing the user to adjust the compensating result, the compensating result generated by the compensating module 12 will be outputted to the control interface 15 first and then transmitted to the controller 17 after being confirmed or adjusted by the user.

In addition to the forgoing system 1 for compensating the characteristics of the fan, the present invention also provides a method for compensating the characteristics of the fan. As described above, the method for compensating the characteristics of the fan of the present invention can be applied to an electronic device for compensating and analyzing characteristics of a heat-dissipating fan of the electronic device. The method for compensating the characteristics of the fan mainly comprises the following steps.

First, a step S51 is performed for analyzing the relation between duty ratio of PWM and the rotational speed of the fan so as to generate an analyzing result. Thereafter, a step S53 is performed for generating a compensating result basing on the above-described analyzing result and a specific proportion relation between the temperature and the duty ratio of PWM. Thereafter, a step S55 is performed for detecting an operation temperature of an electronic device and a step S56 is performed for providing a specific duty ratio of PWM basing on the operation temperature and the compensating result so as to adjust the rotational speed of the fan.

In one preferred embodiment, the method for compensating the characteristics of the fan further comprises an adjusting step S57 for allowing the user to adjust the compensating result. Namely, the user is allowed to set respective specific proportion relation between the temperature and the duty ratio of PWM for different temperature ranges.

In addition, in one preferred embodiment, after the analyzing step S51 is completed, the above-described method for compensating the characteristics of the fan further comprises a graphing step S52 for displaying the analyzing result on a monitor of the electronic device by a line distributed in a rectangular coordinate system, wherein a transverse coordinate is the duty ratio of PWM and a longitudinal coordinate is the rotational speed of the fan.

Furthermore, after the step S53 is completed, the above-described method for compensating the characteristics of the fan further comprises another graphing step S54 for displaying the compensating result on the monitor of the electronic device by a line distributed in the rectangular coordinate system, wherein the transverse coordinate is the temperature and the longitudinal coordinate is the duty ratio of PWM.

After completing the above-described step S54, the user is allowed to set respective slope between the temperature and the duty ratio of PWM for different temperature ranges in the subsequent adjusting step S57 so as to adjust the compensating result.

The present invention has great advantages. First, the present invention allows the user to confirm the characteristics of the fan of the electronic device and thereby know the relation between the rotational speed of the fan and the duty ratio of PWM during the practical rotation. Furthermore, the present invention can provide the corresponding compensating way for the analyzing result of the characteristics of the fan so as to allow the fan to be operated in linear condition.

Moreover, the present invention also provides a graphical operation interface to make the user easier to know the practical rotation of the fan. The relation between the duty ratio of PWM and the rotational speed of the fan can be shown via the characteristics curve of the fan. In addition, the slope relation between the temperature and the duty ratio of PWM can be shown via the compensating curve of the fan so as to compensate the characteristics curve. Besides, the operation interface also allows the user to self-adjust the compensating result so as to decide the specific slope relation between the temperature and the duty ratio of PWM of respective temperature range for thereby providing the user with possibility to adjust and control the fan.

Furthermore, according to the traditional design of the fan, the user is not allowed to confirm or know whether the related device of the fan has been aged or damaged. By using the system for compensating the characteristics of the fan of the present invention, however, the user is allowed to immediately know the operation and the rotation condition of the fan of the electronic device so as to perform the corresponding adjustment.

In addition, the system for compensating the characteristics of the fan of the present invention is directed toward the adjustment and setting of the proportion relations between temperature and duty ratio of PWM of several temperature ranges. Therefore, the user can set the rotation condition of the fan via the characteristics compensating system of the fan basing on the condition to use the electronic device. For example, if the electronic device is a computer, the user can program different slopes of several temperature ranges basing on the habit, the utilized program, and the environmental temperature.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A system for compensating characteristics of a fan, applied to a heat-dissipating fan of an electronic device, comprising:

an analyzing module for analyzing a relation between a rotational speed of the fan and a duty ratio of pulse width modulation (PWM) so as to generate an analyzing result, wherein the non-linear curve between the rotational speed of the fan and the duty ratio of PWM is analyzed, thereby to generate a specific non-linear relation between a temperature and the duty ratio of PWM; and a compensating module for generating a compensating result basing on the analyzing result and the specific non-linear relation between the temperature and the duty ratio of PWM to obtain a linear relation between the rotational speed of the fan and the temperature.

2. The system for compensating the characteristics of the fan of claim 1, further comprising a control interface so as to adjust the compensating result.

3. The system for compensating the characteristics of the fan of claim 2, wherein the specific proportion relation between the temperature and the duty ratio of PWM for different temperature ranges is set respectively by using the control interface.

4. The system for compensating the characteristics of the fan of claim 2, wherein the control interface is a graphical user interface (GUI).

5. The system for compensating the characteristics of the fan of claim 4, wherein the compensating result displayed on the control interface is a line distributed in a rectangular coordinate system, and a transverse coordinate of the rectangular coordinate system is the temperature and a longitudinal coordinate of the rectangular coordinate system is the duty ratio of PWM.

6. The system for compensating the characteristics of the fan of claim 5, wherein a slope between the temperature and the duty ratio of PWM for different temperature ranges is set respectively by using the control interface so as to adjust the compensating result.

7. The system for compensating the characteristics of the fan of claim 4, wherein the analyzing result displayed on the control interface is a line distributed in a rectangular coordinate system, and a transverse coordinate of the rectangular coordinate system is the duty ratio of PWM and a longitudinal coordinate of the rectangular coordinate is the rotational speed of the fan.

8. The system for compensating the characteristics of the fan of claim 1, further comprising:

a temperature-detecting module for detecting the temperature of the electronic device so as to output a detected temperature.

9. The system for compensating the characteristics of the fan of claim 8, further comprising:

a controller, connected respectively to the compensating module and the temperature-detecting module so that a specific duty ratio of PWM can be outputted for controlling the rotational speed of the fan basing on the compensating result and the detected temperature.

10. A method for compensating characteristics of a fan, applied to a heat-dissipating fan of an electronic device, comprising the steps of:

analyzing a relation between a duty ratio of pulse width modulation (PWM) and a rotational speed of the fan so as to generate an analyzing result, wherein the non-linear curve between the rotational speed of the fan and the duty ratio of PWM is analyzed;

generating a specific non-linear relation between the duty ratio of PWM and a temperature according to the non-linear curve between the rotational speed of the fan and the duty ratio of PWM;

generating a compensating result basing on the analyzing result and the non-linear relation between the duty ratio of PWM and the temperature;

detecting an operation temperature of the electronic device; and generating a specific duty ratio of PWM basing on the operation temperature and the compensating result so as to adjust the rotational speed of the fan to obtain a linear relation between the rotational speed of the fan and the temperature.

11. The method for compensating the characteristics of the fan of claim 10, further comprising performing an adjusting step for adjusting the compensating result.

12. The method for compensating the characteristics of the fan of claim 11, wherein the adjusting step is performed to set the specific proportion relation between the temperature and the duty ratio of PWM for different temperature ranges respectively.

13. The method for compensating the characteristics of the fan of claim 10, further comprising performing a graphing step for displaying the compensating result on a monitor of the electronic device by a line distributed in a rectangular coordinate system, wherein a transverse coordinate of the rectangular coordinate system is the temperature and a longitudinal coordinate of the rectangular coordinate system is the duty ratio of PWM.

14. The method for compensating the characteristics of the fan of claim 13, further comprising performing an adjusting step for setting a slope between temperature and the duty ratio of PWM for different temperature ranges respectively so as to adjust the compensating result.

15. The method for compensating the characteristics of the fan of claim 10, further comprising performing a graphing step for displaying the analyzing result on a monitor of the electronic device by a line distributed in a rectangular coordinate system, wherein a transverse coordinate of the rectangular coordinate system is the duty ratio of PWM and a longitudinal coordinate of the rectangular coordinate system is the rotational speed of the fan.

* * * * *